Figure 1:
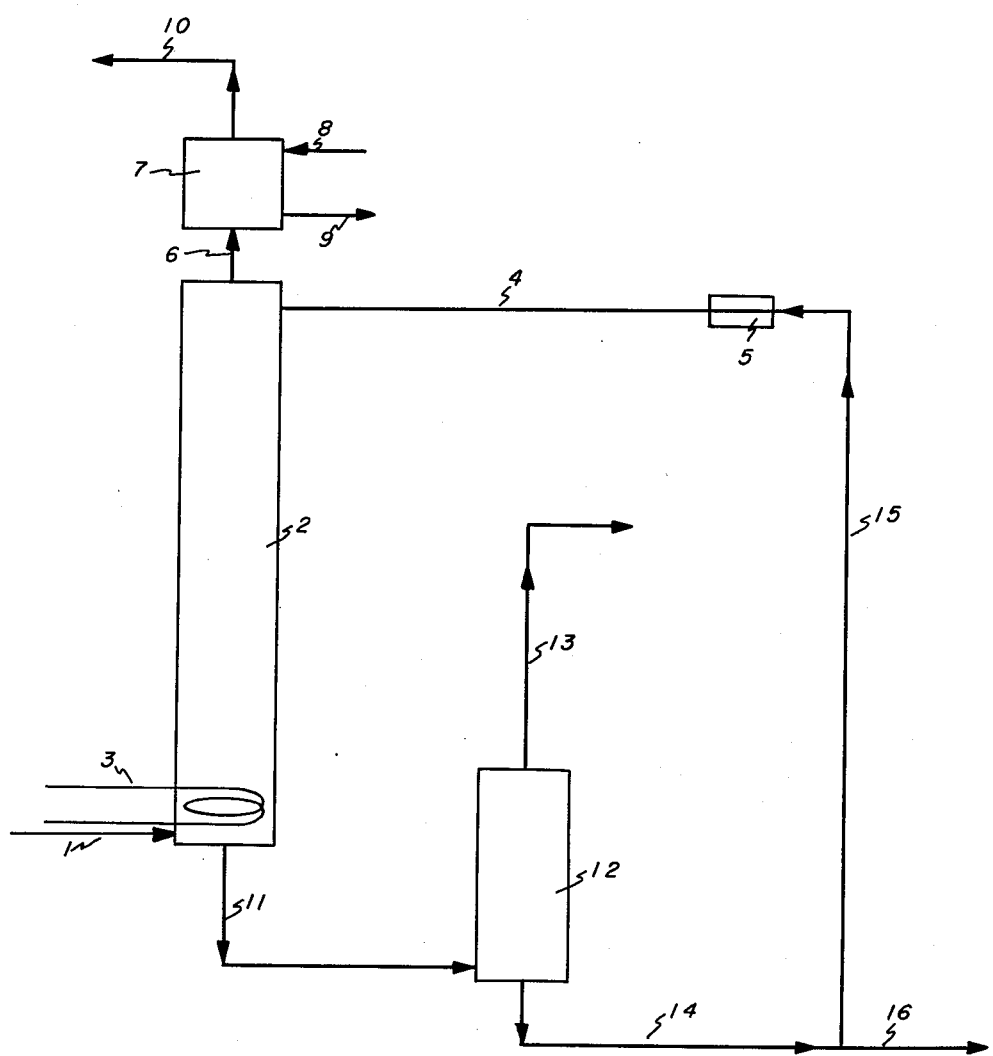

April 18, 1961 W. G. JOHNSON 2,980,727
ACRYLONITRILE EXTRACTION PROCESS
Filed Jan. 22, 1959

INVENTOR.
WILLIAM G. JOHNSON
BY

United States Patent Office 2,980,727
Patented Apr. 18, 1961

2,980,727
ACRYLONITRILE EXTRACTION PROCESS

William G. Johnson, Woodbury, N.J., assignor to E. I. du Pont de Nemours and Company, Wilmington, Del., a corporation of Delaware Filed Jan. 22, 1959, Ser. No. 788,381

3 Claims. (Cl. 260—465.9)

The present invention relates to a process for treating the product stream from a reactor in which acrylonitrile is synthesized. More particularly, this invention relates to a process for treating the product stream so as to recover acrylonitrile and to provide a recycle gas stream.

In carrying out the manufacture of acrylonitrile by the reaction of nitric oxide and propylene in the presence of a dehydrogenation catalyst as disclosed in U.S. Patent 2,736,739, maximum yields and conversions are obtained when a large excess of propylene is used in the process. Economic considerations make desirable the use of the commercially available propylene which contains about 15% by volume of propane as the hydrocarbon feed, and the use of the product stream from an ammonia oxidation unit which contains about 15% by volume of nitric oxide, the remainder being primarily nitrogen, as the nitric oxide feed. The product gas from the acrylonitrile synthesis thus contains, in addition to acrylonitrile, all of the nitrogen, all of the propane, and the unreacted portion of the propylene in the original feed.

Simple removal of the acrylonitrile and discard of the remainder of the product gas is not economically feasible in view of the high content of propylene remaining in the product gas. Alternatively, direct recycle of the gas stream after the removal of the acrylonitrile is not feasible either because of the increased proportion of nitrogen and propane such recycle would introduce to the system. Obviously, the most desirable recycle stream would be one containing only propylene and propane in essentially the same proportions as in the original hydrocarbon feed. Thus, a procedure is needed to remove the acrylonitrile, the nitrogen, and a portion of the propane from the reactor product gas.

The acrylonitrile can be removed from the product gas by simply cooling to condense the acrylonitrile, or the nitrogen can easily be separated from the product gas by absorbing the propane, propylene, and acrylonitrile in a suitable solvent.

Removal of a portion of the propane from the product gas without simultaneous removal of an appreciable quantity of propylene, however, is a more complex matter. The removal of a portion of the propane from the product gas by ordinary fractional distillation is exceedingly difficult and highly impractical because of the closely similar vapor pressures of propane and propylene. However, a vapor-liquid phase separation of propylene from propane is possible by extractive distillation of the mixture in the presence of a relatively higher-boiling selective solvent which will increase the spread in the partial pressures, and thus in the relative volatilities, of the propylene and propane. The vapor fraction will be enriched in the component showing the less positive deviation from Raoult's law of ideal solutions, and the bottoms or liquid fraction will consist of the added solvent enriched in the component showing the greater positive deviation from Raoult's law.

The effectiveness of a separation by extractive distillation is dependent on the proper choice of solvent. The solvent to be added must not form an azeotrope with any of the components to be separated, and it must have a higher boiling point then nitrogen, propane, or propylene. The solvent must have a different effect upon the partial pressures of propane and propylene in solution.

To fulfill the present requirements, the extractive distillation solvent must permit the desired degree of separation of propane from the acrylonitrile reactor product gas, must absorb essentially all the acrylonitrile present, and must permit the separation of essenially altl the nitrogen.

Accordingly, it is an object of the present invention to provide a method for reducing the propane content in an acrylonitrile reactor product gas containing propane, propylene, nitrogen, and acrylonitrile. It is another object of this invention to recover essentially all of the acrylonitrile from an acrylonitrile reactor product gas containing propane, propylene, nitrogen, and acrylonitrile. It is a further object of this invention to provide a method for the separation of essentially all the nitrogen from an acrylonitrile reactor product gas containing propane, propylene, nitrogen, and acrylonitrile. It is a still further object of this invention to provide a method wherein the reduction of the propane content, recovery of the acrylonitrile, and separation of the nitrogen from an acrylonitrile reactor product gas containing propane, propylene, nitrogen, and acrylonitrile are carried out in one step. Other objects will become apparent as the invention is more fully described.

The foregoing objects are achieved when an acrylonitrile reactor product gas containing propane, propylene, nitrogen, and acrylonitrile is introduced into the lower portion of a rectification tower and liquid acrylonitrile is introduced into the upper portion of the towel to permit the liquid acrylonitrile to contact the propane-propylene-nitrogen-acrylonitrile stream in counter-current relationship, the quantities of ingredients and the conditions of operation being such that essentially all of the propylene and acrylonitrile from the acrylonitrile reactor product gas will be withdrawn with the liquid acrylonitrile whereas essentially all of the nitrogen and a portion of the propane will be withdrawn as vapor.

A flow diagram for a process using the solvent of this invention is shown in Figure 1. The drawing is illustrative only and not to be construed as limiting the invention in any way.

Referring now specifically to Figure 1, product gas from the acrylonitrile reactor comprising propane, propylene, nitrogen, and acrylonitrile enters through line 1 to rectification tower 2 which is equipped with cooling coil 3. Liquid acrylonitrile in line 4 passes through cooling means 5 and is introduced into tower 2. Tower 2 contains trays, sieve plates, bubble-cap plates, or packing, to a height corresponding to a number of theoretical plates as calculated by a method well-known in the art, e.g., heat and material balances on each plate, corrected by an empirically determined plate efficiency figure. Vapor enriched in propane and containing a small amount of the acrylonitrile and essentially all of the nitrogen is removed overhead through line 6 and fed into acrylonitrile scrubber 7. Water introduced into scrubber 7 through line 8 absorbs the residual acrylonitrile from the vapor overhead, and the acrylonitrile-in-water solution leaves scrubber 7 through line 9 and is sent to the purification system. A solvent other than water which will absorb acrylonitrile may be used in the scrubber. The acrylonitrile-free vapor is removed from scrubber 7 through line 10. A liquid fraction comprising the liquid acrylonitrile and the acrylonitrile, propylene, and propane from the acrylonitrile reactor product gas not removed as vapor is withdrawn from tower 2 through line 11 and introduced into column 12 where the propylene and propane are flashed from the acrylonitrile. The propylene and propane are recovered through line 13 and recycled to the acrylonitrile reactor. The propane- and propylene-free acrylonitrile is withdrawn through line 14, a portion of the acrylonitrile is recycled to tower 2 through lines 14 and 4, and the remainder of the acrylonitrile is sent through line 16 to the purification system.

The following examples illustrate the present invention. The examples are descriptive only and are not intended to limit the invention in any manner.

propylene-nitrogen-acrylonitrile mixture may be increased by increasing the rate of feed of the liquid acrylonitrile relative to the rate of feed of the gas stream and/or increasing the height of the tower.

In Examples 1 through 8, the mole ratio of propylene to propane in the recycle gas stream to the acrylonitrile reactor was 85 to 15. This ratio was obtained from reactor product gases in which the propylene-to-propane mole ratio varied from 84.4-to—15.6 to 83.2-to—16.8. If the product gas has a different propylene-to-propane

| Example | 1 | 2 | 3 | 4 | 5 | 6 | 7 | 8 |
|---|---|---|---|---|---|---|---|---|
| ACRN reactor product gas feed to bottom of tower at 40° C. (moles/hr.) | | | | | | | | |
| Propylene | 2,500 | 2,500 | 2,500 | 2,500 | 2,500 | 1,341 | 1,341 | 1,145 |
| Propane | 464 | 464 | 464 | 464 | 464 | 269 | 269 | 232 |
| Nitrogen | 160 | 1,300 | 1,300 | 1,300 | 1,300 | 1,821 | 1,821 | 1,556 |
| ACRN | 122 | 122 | 122 | 122 | 122 | 184 | 184 | 168 |
| Composition of gas feed to bottom of tower (Vol. percent): | | | | | | | | |
| Propylene | 77 | 57 | 57 | 57 | 57 | 37 | 37 | 38 |
| Propane | 14 | 11 | 11 | 11 | 11 | 7 | 7 | 7 |
| Nitrogen | 5 | 29 | 29 | 29 | 29 | 51 | 51 | 50 |
| ACRN | 4 | 3 | 3 | 3 | 3 | 5 | 5 | 5 |
| Vol. percent of propane in propane-propylene content of gas feed | 15.6 | 15.6 | 15.6 | 15.6 | 15.6 | 16.7 | 16.7 | 16.8 |
| Liquid ACRN feed to top of tower (moles/hr.) | 3,540 | 3,545 | 2,320 | 2,320 | 2,320 | 3,182 | 3,184 | 3,201 |
| Temp. of liquid ACRN feed to top of tower (° C.) | 4.8 | 6.1 | −26 | −10 | −15 | −23 | −10 | −5 |
| Temp. of liquid ACRN and of gas at bottom of tower (° C.) | 0 | 0 | 0 | 20 | 27 | 2 | 20 | 0 |
| Pressure at bottom of tower (mm. Hg) | 3,607 | 9,127 | 9,127 | 9,127 | 9,127 | 9,127 | 9,127 | 9,127 |
| No. of theoretical plates in tower | 7 | 7 | 8 | 7 | 7 | 17 | 16 | 14 |
| Vapor removed overhead from tower (moles/hr.): | | | | | | | | |
| Propylene | 27 | 27 | 27 | 27 | 27 | 3 | 3 | 15 |
| Propane | 27 | 27 | 27 | 27 | 27 | 33 | 33 | 33 |
| Nitrogen | 160 | 1,300 | 1,300 | 1,300 | 1,300 | 1,821 | 1,821 | 1,556 |
| ACRN | 3 | 7 | 2 | 3 | 2 | 2 | 4 | 5 |
| ACRN recovered in absorber from vapor overhead (moles/hr.) | 3 | 7 | 2 | 3 | 2 | 2 | 4 | 5 |
| Liquid withdrawn from bottom of tower (moles/hr.): | | | | | | | | |
| ACRN | 3,659 | 3,660 | 2,440 | 2,439 | 2,440 | 3,361 | 3,364 | 3,364 |
| Propane | 437 | 437 | 437 | 437 | 437 | 236 | 236 | 199 |
| Propylene | 2,473 | 2,473 | 2,473 | 2,473 | 2,473 | 1,333 | 1,338 | 1,130 |
| Vol. percent of propane in propane-propylene steam flashed from liquid bottoms | 15.0 | 15.0 | 15.0 | 15.0 | 15.0 | 15.0 | 15.0 | 15.0 |

ACRN = acrylonitrile.

A polymerization inhibitor may be required in the acrylonitrile product gas to prevent polymerizatiton of the acrylonitrile and attendant plugging of the tower and the lines by polymeric material. The crude acrylonitrile product gas may contain impurities which act as polymerization inhibitors, thus obviating the necessity of separately adding a polymerization inhibitor, or a conventional acrylonitrile polymerization inhibitor may be added to the acrylonitrile reactor product gas before it is fed to the rectification tower. Alternatively, the present process may be carried out at a temperature below that at which acrylonitrile polymerizes, in which case a polymerization inhibitor is not needed.

Examples 1 through 8 show the separation of all of the nitrogen and a portion of the propane and the recovery of all of the acrylonitrile from acrylonitrile reactor product gas containing 37–77% by volume of propylene, 7–14% by volume of propane, 5–51% by volume of nitrogen, and 3–5% by volume of acrylonitrile to obtain a gas stream containing 85% by volume of propylene and 15% by volume of propane which is suitable for recycle to the acrylonitrile reactor.

As is obvious to one skilled in the art, the separation of propane and propylene is dependent on several interrelated factors; namely, the height of the tower, the rates of feed of the acrylonitrile reactor product gas and the liquid acrylonitrile, the temperatures of the acrylonitrile reactor product gas and the liquid acrylonitrile feed streams and of the tower, the pressure within the tower, and the pressure drop per plate within the tower; and a propane-propylene mixture of any desired composition may be obtained via the process of the present invention by judicious adjustment of these factors. For instance, the proportion of propane separated from the propane-ratio, the rectification tower conditions can be altered by conventional means to compensate for such variance and still produce a recycle gas having an 85 to 15 propylene to propane ratio. On the other hand, a feed-gas to the acrylonitrile reactor having a different ratio of propylene to propane may be used. In such case, the tower and conditions will be designed to provide the desired rectification of the product gas so that the recycle gas ratio will match the feed gas ratio. Thus, this invention is not limited to the specific ranges illustrated in these examples.

The height of a rectification tower, generally termed "column height," is determined by the number of plates or by the height of the packing in the tower. Since the performance of plate-column equipment is recognized as more or less standard, the performance of plate-column equipment, e.g., packed columns, is generally reduced to equivalent terms to facilitate comparison with plate columns. The number of plates is determined by the number of theoretical plates required to effect the desired separation corrected by an empirically determined plate efficiency figure as mentioned earlier. The number of theoretical plates is primarily dependent on the nature of the feed, i.e., the difficulty of separation of the components to be separated and on the degree of separation desired, and on the nature of the separating agent. In addition, the column height, or number of plates, needed for a given degree of separation is directly related to other design factors such as the rate of feed of the liquid acrylonitrile and the rate of feed of the stream containing the components to be separated. In Examples 1 through 8 various superatmospheric pressures (specifically 3607 and 9127 mm. Hg) were maintained at the bottom of the rectification tower but it will be appreciated that the process may be effected at virtually any pressure by suitable adjustment of the temperature, and conversely, any desired temperature of operation may be used by employing a corresponding pressure. These factors—column height, rates of feed of the ingredients, temperature, and pressure—are determined for the present process by methods well known to the art.

An added feature of the process of the present invention is that no heat need be supplied to the process because the heat of solution provides the heat required for distillation. This feature makes for economy of operation.

The nature and objects of the present invention have been completely described and illustrated in the foregoing disclosure. The invention is not limited to the exact details shown and described, as obvious modifications will become apparent to those skilled in the art. Accordingly, this invention is limited only by the following claims.

I claim:

1. A process for elimination of substantially all the nitrogen and a substantial proportion of the propane content from an acrylonitrile reactor product gas consisting essentially of propane, propylene, acrylonitrile, and nitrogen which comprises introducing said propane-propylene-acrylonitrile-nitrogen stream near the bottom of a rectification tower maintained under superatmospheric pressure, introducing liquid acrylonitrile near the top of said tower, permitting the liquid acrylonitrile to contact the propane-propylene-acrylonitrile-nitrogen stream in countercurrent relationship, removing a gaseous fraction containing substantially all of the nitrogen and enriched in propane, and removing a liquid fraction comprising acrylonitrile containing dissolved therein the propylene and the remaining propane.

2. A process as in claim 1 wherein the propane and propylene dissolved in said acrylonitrile are separated therefrom by flashing and said separated propane and propylene are recycled to the acrylonitrile reactor.

3. A process as in claim 1 wherein acrylonitrile contained in said gaseous fraction is removed therefrom by absorption in water.

References Cited in the file of this patent

UNITED STATES PATENTS

| | | |
|---|---|---|
| 2,702,300 | Keller et al. | Feb. 15, 1955 |
| 2,736,739 | England et al. | Feb. 28, 1956 |
| 2,738,030 | Keller et al. | Mar. 13, 1956 |
| 2,773,088 | Maslan | Dec. 4, 1956 |
| 2,803,641 | Sandner et al. | Aug. 20, 1957 |
| 2,878,166 | Dunn | Mar. 17, 1959 |